(12) United States Patent
Spronken

(10) Patent No.: US 10,139,037 B2
(45) Date of Patent: Nov. 27, 2018

(54) PREFABRICATED REUSABLE CONCRETE PEDESTAL ELEMENT

(71) Applicant: John Rene Spronken, Calgary (CA)

(72) Inventor: John Rene Spronken, Calgary (CA)

( * ) Notice: Subject to any disclaimer, the term of this patent is extended or adjusted under 35 U.S.C. 154(b) by 0 days.

(21) Appl. No.: 15/390,978

(22) Filed: Dec. 27, 2016

(65) Prior Publication Data

US 2018/0172199 A1 Jun. 21, 2018

(30) Foreign Application Priority Data

Dec. 21, 2016 (CA) ...................................... 2952374

(51) Int. Cl.
| | | |
|---|---|---|
| *F16M 1/00* | (2006.01) | |
| *F16M 9/00* | (2006.01) | |
| *B66C 23/26* | (2006.01) | |
| *B66C 23/72* | (2006.01) | |
| *B66C 13/00* | (2006.01) | |
| *F16B 5/06* | (2006.01) | |

(52) U.S. Cl.
CPC .............. *F16M 9/00* (2013.01); *B66C 13/00* (2013.01); *B66C 23/26* (2013.01); *B66C 23/72* (2013.01); *F16B 5/0635* (2013.01); *F16M 2200/08* (2013.01)

(58) Field of Classification Search
CPC ......... B66C 13/00; F16M 9/00; F16B 5/0635; F02D 27/42; F02D 27/44; F04H 12/2261
USPC ..... 248/679, 346.01, 346.02; 52/294, 223.12
See application file for complete search history.

(56) References Cited

U.S. PATENT DOCUMENTS

| | | | | |
|---|---|---|---|---|
| 4,898,358 A | * | 2/1990 | Spronken .............. | E01C 19/502 249/208 |
| 4,922,676 A | * | 5/1990 | Spronken .............. | E04B 1/6801 52/396.05 |

(Continued)

FOREIGN PATENT DOCUMENTS

| | | |
|---|---|---|
| CA | 40855 | 6/1976 |
| CA | 40923 | 7/1976 |

(Continued)

OTHER PUBLICATIONS towercranechina.com website, Aug. 24, 2012, Zhengzhou Unique Industrial Equipment Co., Ltd.; Shortlink http://wp.me/p2GhOC-9.

(Continued)

*Primary Examiner* — Todd M Epps
(74) *Attorney, Agent, or Firm* — Reichel Stohry LLP; Mark C. Reichel; Natalie J. Dean

(57) ABSTRACT

Disclosed is a base assembly for supporting a crane pedestal. The base assembly comprises four base units, each having a first end and a second end, and each base unit being of an L-shape with an outside beveled corner. Fastening devices connect each base unit at their first and second end to respective first and second ends of another of the four base units. The four base units are dimensioned so that, when connected by said fastening devices, they form an octagonal-shaped base structure. The four base units are also dimensioned to support four pads that each rest on a face of 14 each unit adjacent to its beveled corner when the four base units are assembled in the octagonal-shaped base structure. Also disclosed is a method for assembling a base assembly for supporting a crane pedestal and a fastening device for connecting the ends of two units together.

10 Claims, 8 Drawing Sheets

(56) References Cited

U.S. PATENT DOCUMENTS

| | | | | |
|---|---|---|---|---|
| 4,989,382 A * | 2/1991 | Spronken | ............ | E04H 13/006 52/134 |
| 6,164,460 A * | 12/2000 | Reuter | ............ | H02B 1/01 211/189 |
| 8,739,496 B2 * | 6/2014 | Brodowski | ............ | E04B 5/38 52/309.7 |
| 2016/0159622 A1 * | 6/2016 | Narcisco | ............ | B66C 23/205 212/175 |
| 2018/0202123 A1 * | 7/2018 | Spronken | ............ | E02D 27/42 |

FOREIGN PATENT DOCUMENTS

| | | |
|---|---|---|
| CA | 127269 | 3/2009 |
| CN | 101718097 B | 9/2011 |
| CN | 202164621 U | 3/2012 |
| CN | 203113364 U | 8/2013 |
| CN | 203498858 U | 3/2014 |
| CN | 203716169 U | 7/2014 |
| CN | 203846523 U | 9/2014 |
| CN | 104088291 A | 10/2014 |
| CN | 103015453 B | 11/2014 |
| CN | 203939043 U | 11/2014 |
| CN | 203947490 U | 11/2014 |
| CN | 204151819 U | 2/2015 |
| CN | 103850265 B | 11/2015 |
| CN | 205062829 U | 3/2016 |
| CN | 104264705 B | 4/2016 |

OTHER PUBLICATIONS

Miniature Construction World website, www.miniature-construction-world.co.uk.

Liu, Jin-long et al.; A Design of Fabricated Concrete Foundation for Tower Crane; International Journal of Advancements in Computing Technology, pp. 934-944, vol. 5, No. 6, Mar. 2013.

* cited by examiner

PREFABRICATED REUSABLE CONCRETE PEDESTAL ELEMENT

TECHNICAL FIELD

Provided herein is a base pedestal assembly for supporting a crane, a method for assembling a base pedestal assembly for supporting a crane and a fastening device for connecting the ends of two units together.

BACKGROUND

There are a multitude of foundations used to support crane structures. Some crane foundations are constructed by digging a foundation ditch, depositing concrete, curing the concrete and then removing the foundation after a project is complete. Other designs make use of a number of different interconnected blocks to provide adequate support for the crane. For example, a known structure comprises 13 different interconnected blocks to withstand forces generated by the crane tower (Liu and Li, International Journal of Advancements in Computer Technology, 5(6):934-944). However, such assemblies are potentially difficult and expensive to manufacture, as well as assemble and disassemble at the crane site.

Further known foundations make use of four individual pads that form a base assembly. Typically, the crane is supported by four legs at its base that, in turn, are each supported by a respective one of the four blocks in the base assembly. While more simple in construction, this arrangement is generally suitable only if the bearing capacity of the ground adjacent to the base of the crane is equal and uniform. However, in cases of heavy rain or frost, the bearing capacity of one or more of the pads may be significantly reduced and place the stability of the crane in jeopardy. It is also desirable if a crane foundation is able to withstand overturning resistance, and achieve adequate load distribution during use of the crane. In order to realize these objectives, many known crane foundations are based on designs that have a number of different component blocks, which increases complexity and negatively impacts economics as described above. While a simple design can reduce manufacturing cost, as well as the cost of transporting and assembling/disassembling the base assembly, the structural stability of the foundation should not be compromised as this can pose a risk to workers and other personnel.

BRIEF SUMMARY

According to one embodiment, there is provided a base assembly for supporting a crane pedestal comprising: (i) four base units, each having a first end and a second end, and each base unit being of an L-shape with an outside beveled corner; (ii) fastening devices for connecting each base unit at its first and second end to respective first and second ends of another of said four base units; the four base units being dimensioned so that, when connected by said fastening devices, the four base units form an octagonal-shaped base structure; and the four base units being dimensioned to support four pads that each rest on a face of each unit adjacent to its beveled corner when the four base units are assembled in the octagonal-shaped base structure.

According to a further embodiment, there is provided a method for assembling a base assembly for supporting a crane, said base pedestal assembly comprising four base units, each having a first end and a second end, and each base unit being of an L-shape with an outside beveled corner, said method comprising: (i) connecting the four base units with fastening devices for connecting the first and second ends of each base unit together, thereby forming an octagonal-shaped base structure; and (ii) placing four pads for supporting the crane on the octagonal-shaped base structure, each pad placed at a location adjacent to the beveled corner of each base unit in the octagonal-shaped base structure.

According to another embodiment, there is provided a fastening device for connecting the ends of two units together, the fastening device comprising: (i) a bottom fastening member having a first side member and a second side member, the first side member for attachment to an end of one of the two units, and the second side member for attachment to an end of a second one of the two units, wherein the first and second side members of the bottom fastening member engage respective bottom faces of the ends of the two units when the two units are aligned and assembled; (ii) a top fastening member having a first side member and a second side member, the first side member of the top fastening member for attachment to an end of one of the two units, and the second side member of the top fastening member for attachment to an end of a second one of the two units, wherein the first and second side members of the top fastening member engage respective top faces of the ends of the units when the units are aligned and assembled; and (iii) a securing assembly for attaching the bottom fastening member and the top fastening member together, thereby securing the bottom and top fastening members on respective bottom and top faces of the two units when assembled.

DETAILED DESCRIPTION

Figure 1A:
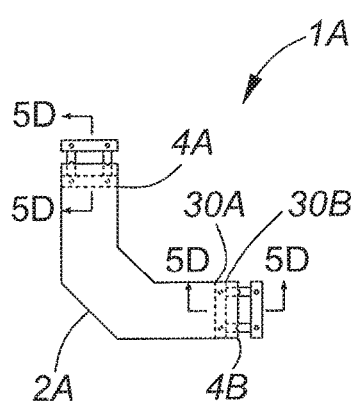
FIG. 1A shows one of four base units in a base assembly for supporting a crane.

The base assembly for supporting a crane comprises four base units. One of such base units is shown in FIG. 1A. As shown in FIG. 1A, the base unit 1A is an L-shape with an outside beveled corner 2A. A first end 4A and a second end 4B of the base unit 1 comprises grooves for attachment of fastening devices, which are described in more detail below. Two of such grooves are labelled 30A and 30B in FIG. 1A.

Figure 1B:
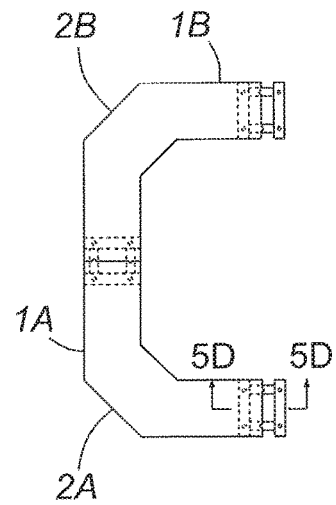
FIG. 1B shows a partially assembled base assembly in which two base units are connected.
Figure 1C:
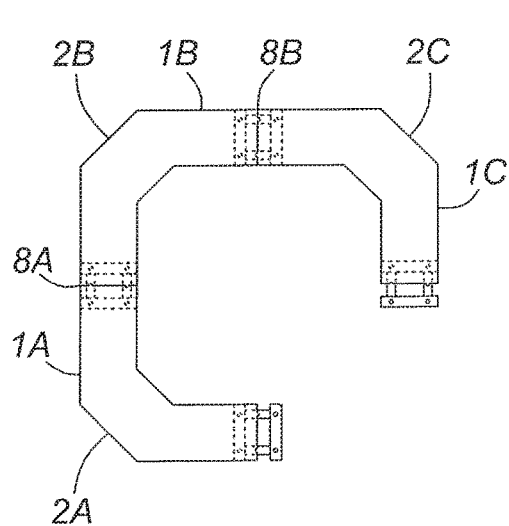
FIG. 1C shows a partially assembled base assembly in which three base units are connected.
Figure 1D:
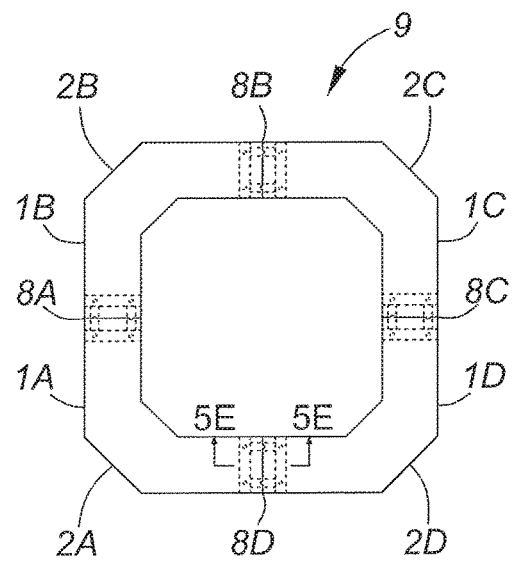
FIG. 1D shows an assembled base assembly in which the four base units are connected

FIG. 1B shows connection of the base unit 1A to a second one of the four base units, depicted in FIG. 1B as base unit 1B. FIG. 1C shows connected base units 1A and 1B, as well as base unit 1C. FIG. 1D shows all four base units, 1A, 1B, 1C and 1D connected by respective fastening devices 8A, 8B, 8C and 8D. The connected base units, 1A, 1B, 1C and 1D form an octagonal-shaped base structure. Each base unit has a beveled corner shown as 2A, 2B, 2C, 2D in FIG. 1D. As can be seen, each beveled corner 2A, 2B, 2C and 2D forms a vertex of the octagonal-shaped base structure.

Figure 2:
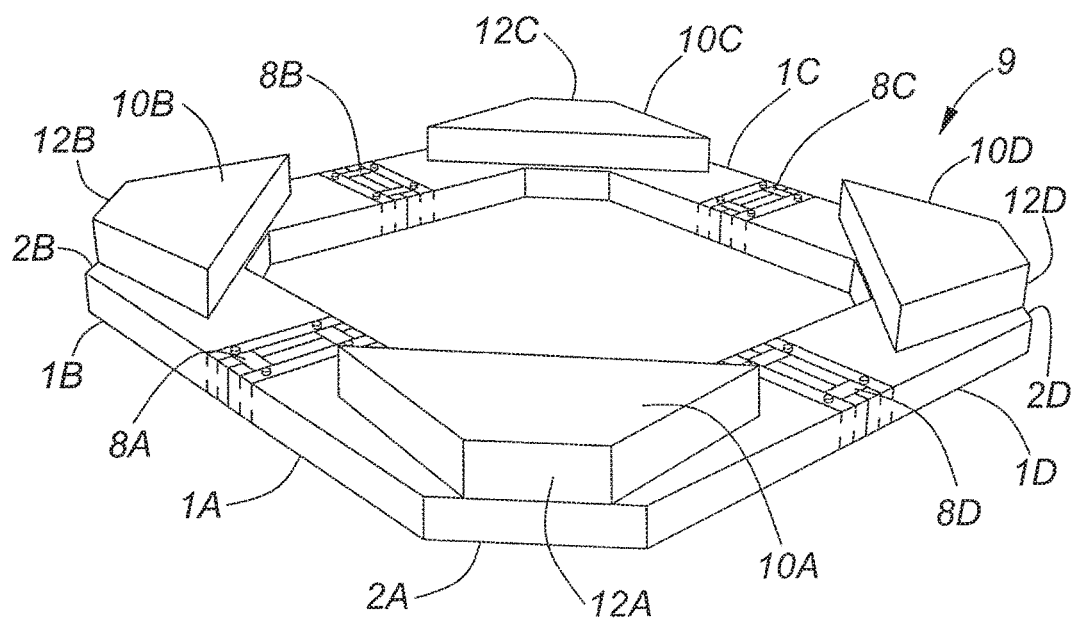
FIG. 2 is a three-dimensional depiction of the assembled base pedestal assembly supporting four pads.

FIG. 2 is a three-dimensional depiction of the assembled base pedestal assembly 9 shown in FIG. 1D. The four base units 1A, 1B, 1C and 1D are dimensioned to support four pads 10A, 10B, 10C and 10D. Each of the four pads 10A, 10B, 10C and 10D rest on a face of each base unit adjacent to the beveled corners 2A, 2B, 2C and 2D when assembled in the octagonal-shaped base structure 9. As can be seen in FIG. 2, each pad 10A, 10B, 10C and 10D has a bevelled corner 12A, 12B, 12C and 12D that aligns with a respective one of the bevelled corners of the base units 1A, 1B, 1C and 1D.

Figure 3:
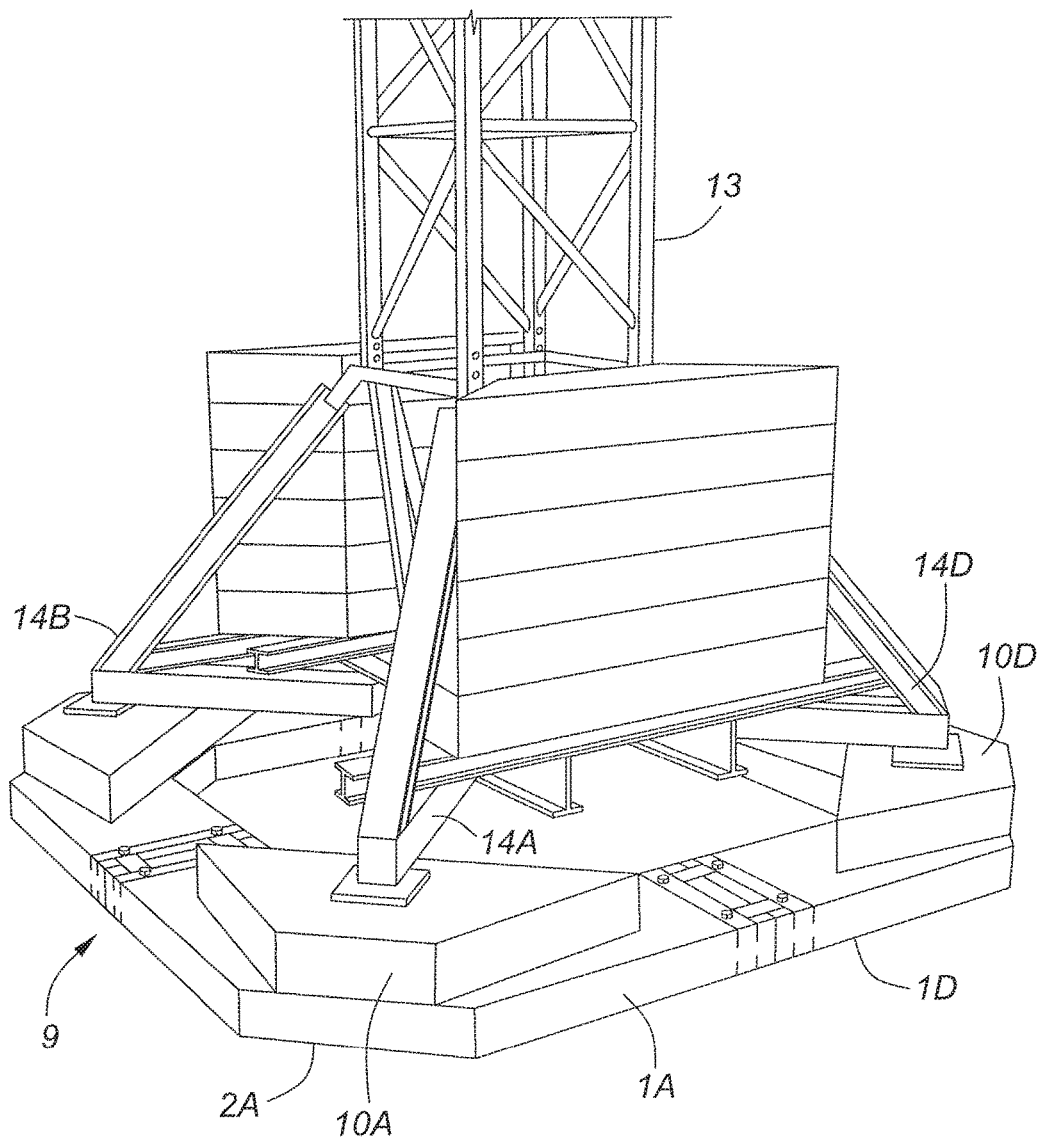
FIG. 3 is a three-dimensional depiction of the assembled base assembly supporting a crane pedestal.

FIG. 3 shows an assembled base pedestal assembly 9 supporting the four pads 10A, 10B, 10C and 10D, which in turn each support one of the four legs of a crane 13. Legs 14A, 14B and 14D of crane 13 are shown in the drawing, but the fourth leg is obscured from view.

As can be seen from FIG. 2 and FIG. 3, the overhead crane pedestal can be supported using only a base assembly 9 having four L-shaped base units and pads 10A, 10B, 10C and 10D. Due to the dimensions of the octagonal-shaped configuration, improved load distribution and increased overturning resistance can be achieved without requiring the use of additional material or by increasing total bearing area. Another notable advantage of the base assembly 9 is that it can be assembled and disassembled easily and re-used at different work sites as required. Other known base assemblies are complicated structures with a variety of different interconnected units, and often cannot be reused. Thus, the embodiments described offer both an improved design and better economics in relation to some of the known designs.

Figure 4A:
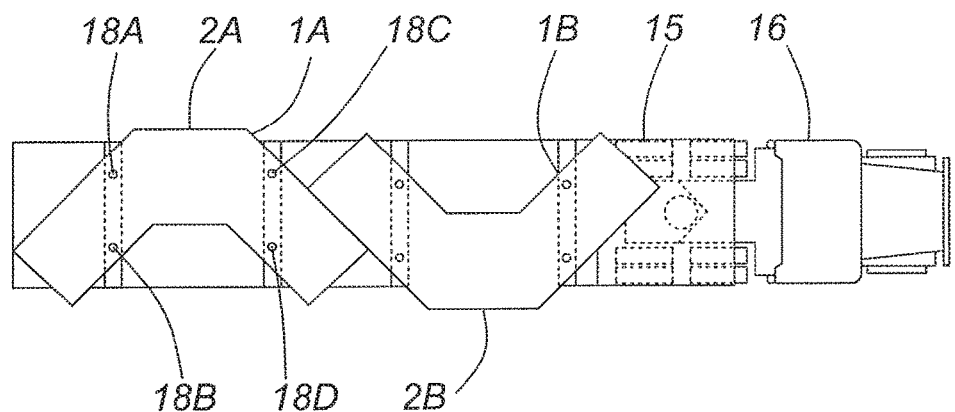
FIG. 4A shows two of the base units placed on a bed of a truck trailer.
Figure 4B:
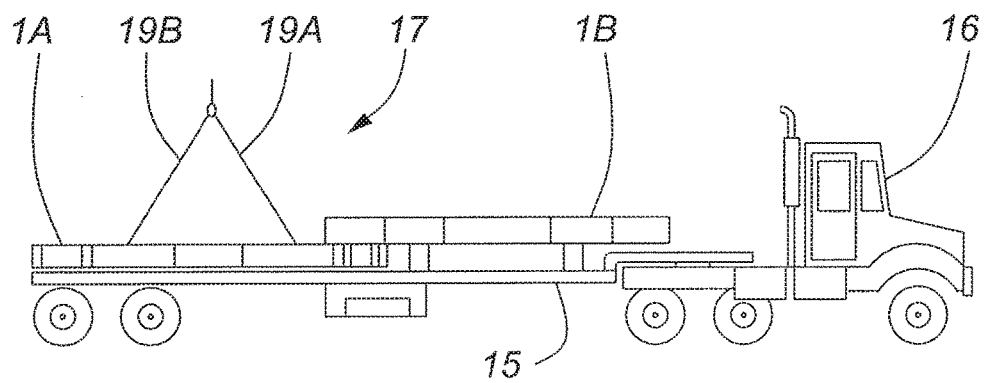
FIG. 4B is a side profile of the two base units placed on the bed of the truck trailer.
Figure 4C:
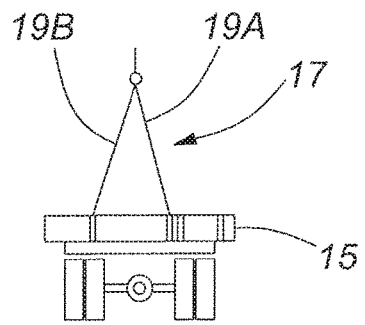
FIG. 4C is an end view of the truck trailer showing one of the base units being lifted off or onto the truck.

The unique structure of the L-shaped base units 1A, 1B, 1C and 1D also facilitates transport of the base pedestal assembly to and from a work site. FIG. 4A shows two of the L-shaped base units 1A and 1B placed on a bed 15 of a truck trailer 16 for transport to and from a construction site where the crane 13 (see FIG. 3) is located. The units can be arranged on the bed 15 with their bevelled corners 2A and 2B facing outwardly in a staggered configuration. As a result of such staggered configuration, both units 1A and 1B can be placed on the bed 15 of a single truck, thereby greatly simplifying transport. The base units 1A and 1B can also be easily hoisted on or lifted off the bed 15 of the truck trailer 16 by respective cables 19A and 19B that form part of a lift system 17 shown in FIGS. 4B and 4C. The cables are attachable to four anchors mounted on each base unit 1A and 1B. The anchors of base unit 1A are shown as 18A, 18B, 18C and 18D, but are omitted from base unit 1B for simplicity.

Figure 5A:
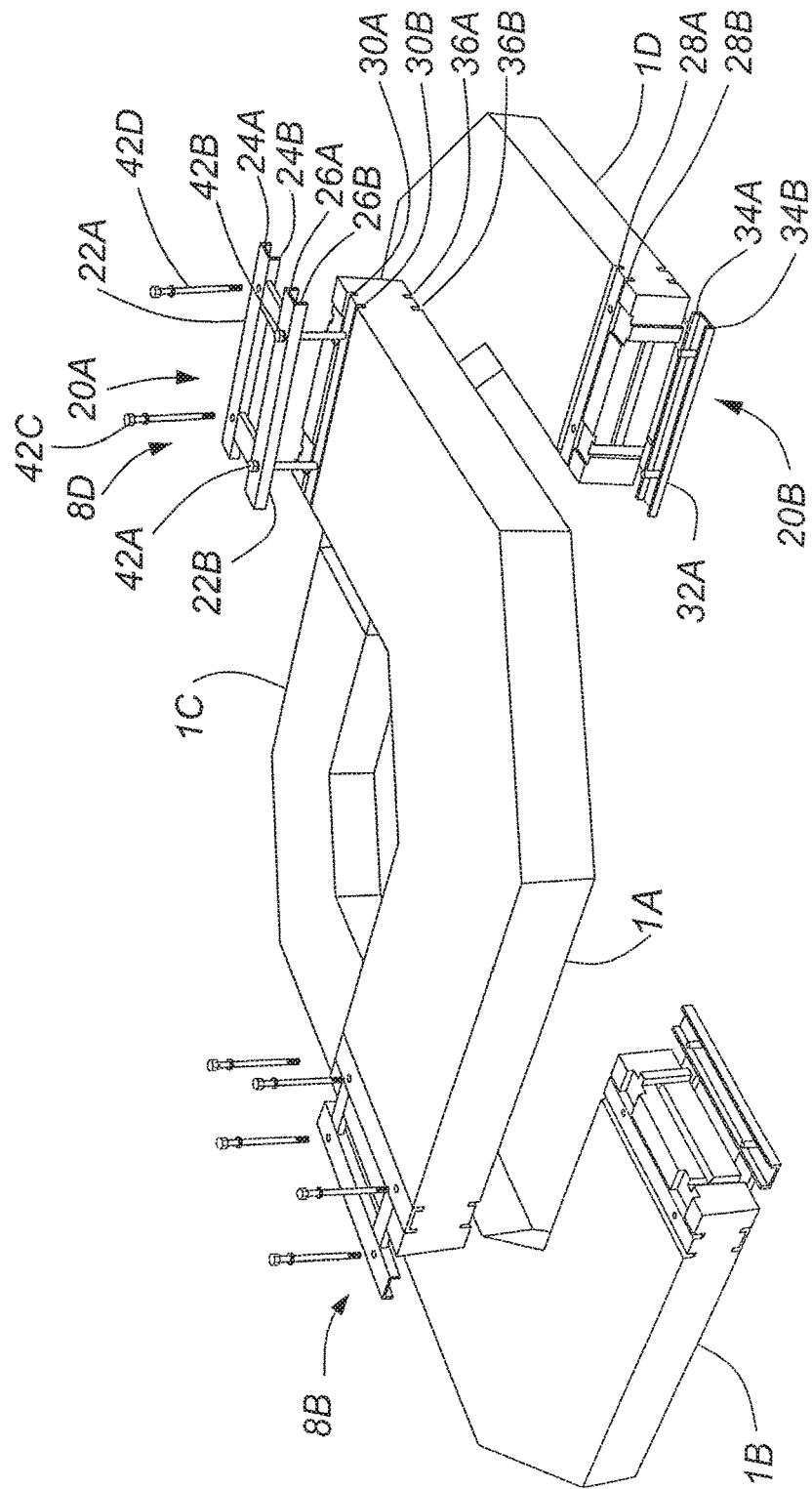
FIG. 5A shows the four base units in three-dimension with the fastening devices for connecting the units together.

The fastening devices 8A, 8B, 8C and 8D for connecting base units 1A, 1B, 1C and 1D to another base unit in the base pedestal assembly are depicted in more detail in FIGS. 5A, 5B, 5C, 5D, 5E and 5F. Fastening devices 8B and 8D are shown in FIG. 5A, while FIGS. 5B, 5C, 5D, 5E and 5F show only fastening device 8D in more detail.

Figure 5B:
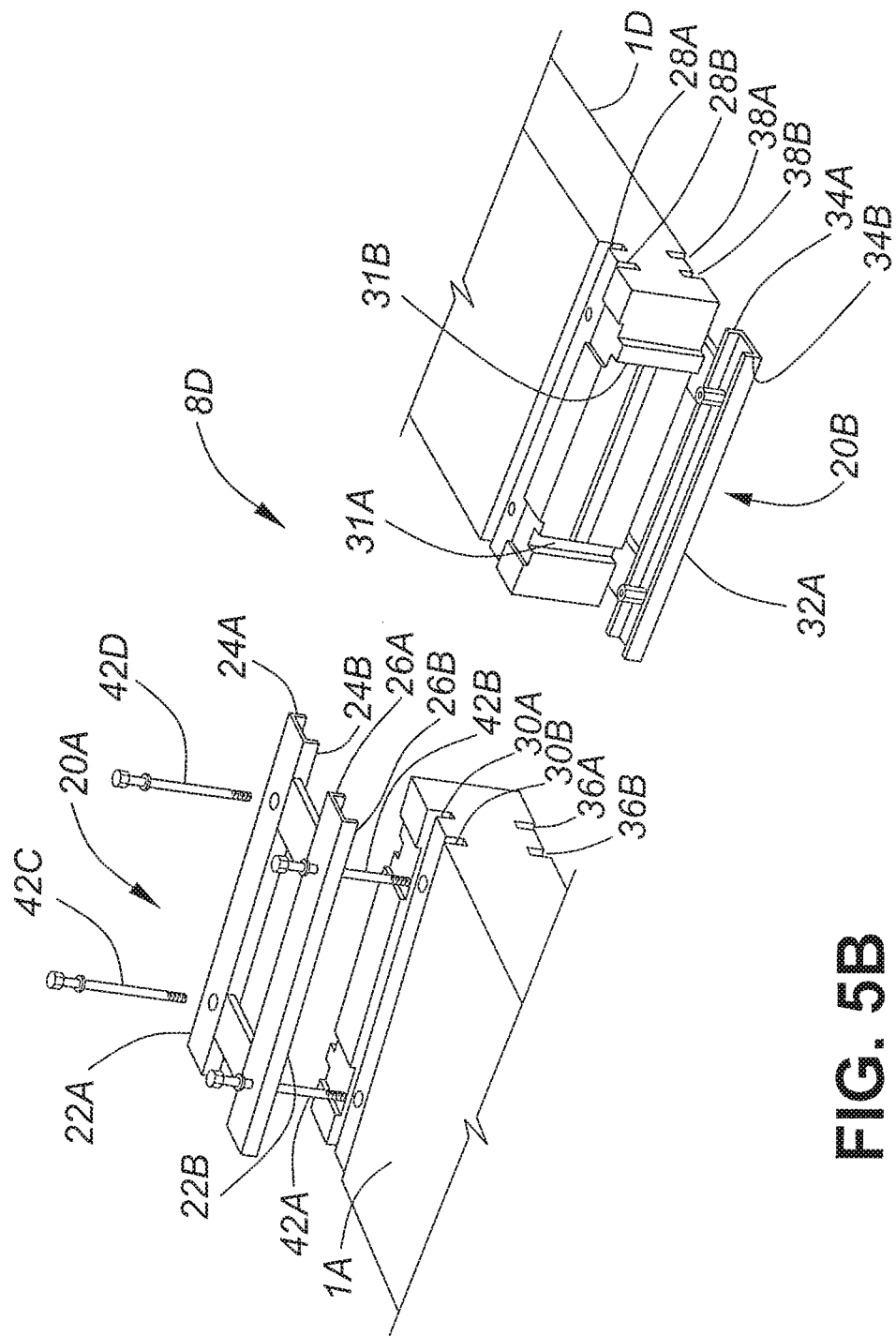
FIG. 5B shows one of the fastening devices in three-dimension in more detail and respective base units.

As can be seen from FIGS. 5A and 5B, fastening device 8D comprises a top fastening member 20A and a bottom fastening member 20B.

The top fastening member 20A has a first side member 22A and a second side member 22B. The first side member 22A comprises a pair of parallel and spaced ribs 24A and 24B. The second side member 22B comprises another pair of parallel and spaced ribs 26A and 26B. Ribs 24A and 24B of the first side member 22A of top fastening member 20A fit into lateral grooves 28A and 28B formed at the top face of base unit 1D, while ribs 26A and 26B on the second side member 22B fit into lateral grooves 30A and 30B formed at the top face of base unit 1A (see FIG. 5A and FIG. 5B). Holes are formed in side members 22A and 22B for accommodating fasteners.

Figure 5C:
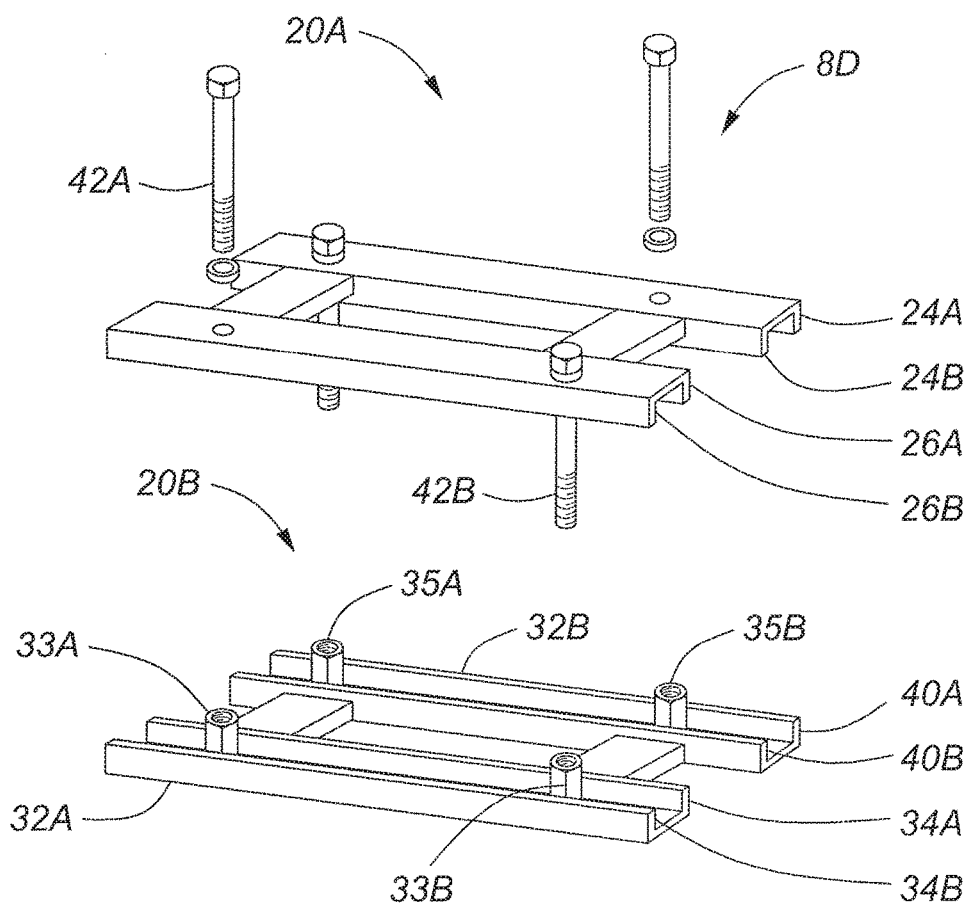
FIG. 5C shows one of the fastening devices in three-dimension not connected to a base unit.

The bottom fastening member 20B also has a first side member 32A and a second side member 32B. The second side member 32B is obscured from view in FIG. 5A and FIG. 5B, but is visible in FIG. 5C. The first side member 32A of bottom fastening member 20B also comprises a pair of parallel and spaced ribs 34A and 34B (FIGS. 5A, 5B and 5C). The second side member 32B comprises a pair of parallel and spaced ribs 40A and 40B (seen only in FIG. 5C). Ribs 34A and 34B of the first side member 32A fit into respective lateral grooves 36A and 36B formed at the bottom face at one end of base unit 1A, while ribs 40A and 40B on the second side member 32B fit into lateral grooves 38A and 38B formed on the bottom face located at one end of base unit 1D (see FIGS. 5A and 5B).

Furthermore, a protrusion 31A and recess 31B are formed in the ends of base units 1A, 1B, 1C and 1D. These can be seen in the right drawing of FIG. 5B. These protrusions and recesses facilitate horizontal alignment of the base units 1A, 1B, 1C and 1D together. As can be seen in FIG. 5B protrusion 31A of base unit 1D fits into a corresponding recess of base unit 1A and the recess 31B receives the protrusion of base unit 1A when units 1A and 1D are connected together.

The bottom fastening member 20B also comprises nuts attached to the parts of the side members 32A and 32B between the ribs. Nuts 33A and 33B are attached to side member 32A between ribs 34A and 34B and nuts 35A and 35B are attached to side member 32B between ribs 40A and 40B. The nuts each receive bolts as described below.

The top fastening member 20A and bottom fastening member 20B of fastening device 8D are connected by a securing assembly. In this embodiment, the securing assembly comprises four fasteners, which are bolts 42A, 42B, 42C and 42D of standard construction that secure the top and bottom fastening members 20A and 20B on respective top and bottom faces of the two base units when assembled. The four bolts 42A, 42B, 42C and 42D fit through respective holes formed in each of the first and second side members of each of the top and bottom fastening members and aligned holes formed between grooves in the base units. It will be appreciated that other fasteners besides bolts could be employed.

The top and bottom fastening members 20A and 20B may effectively form a clamp that has the capacity to transfer bending capacity across the joint when fully assembled.

Figure 5D:
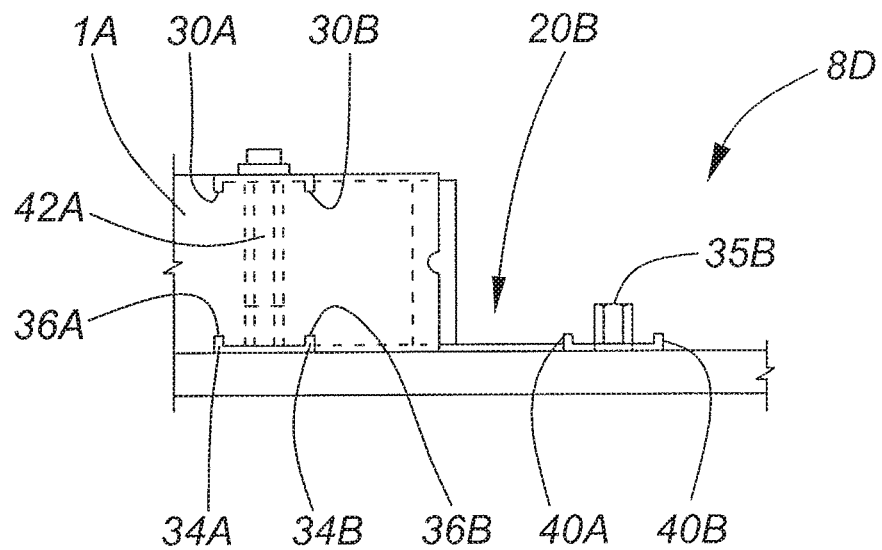
FIG. 5D is a cross-sectional view of the fastening device taken along the line a shown in FIG. 1A.

FIG. 5D is a cross-sectional view of fastening device 8D taken along the line a shown in FIGS. 1A and 1B when the base assembly is partially assembled. FIG. 5D shows block unit 1A with grooves 30A and 30B formed therein as described previously. The bottom fastening member 20B is also shown with ribs 34A and 34B fitted into grooves 36A and 36B of base unit 1A. The nut 35B attached between ribs 40A and 40B is also depicted in the drawing. The bottom face of base unit 1A is supported by a bed of sand, crushed rock or the like.

Figure 5E:
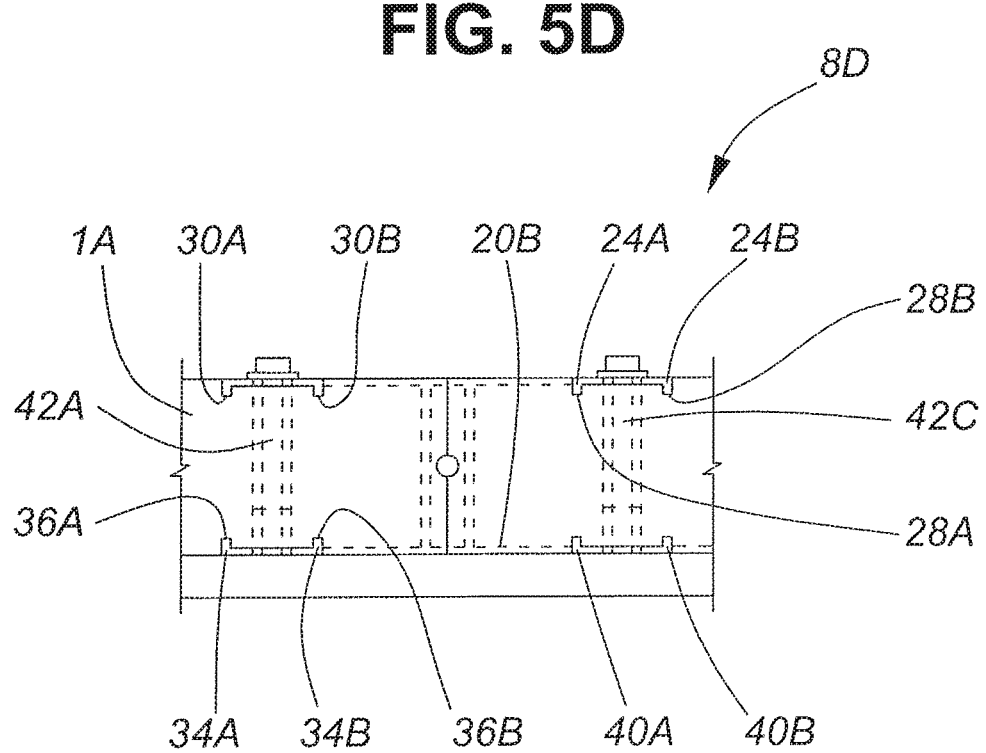
FIG. 5E is a cross-sectional view of the fastening device when fully assembled taken along the line b shown in FIG. 1D.

FIG. 5E is a cross-sectional view of fastening device 8D when fully assembled taken along the line b shown in FIG. 1D. FIG. 5E shows both block unit 1A and block unit 1D secured by fastening device 8D. Grooves 30A and 30B formed in block unit 1A are shown as described previously. The bottom fastening member 20B is also shown with ribs 34A and 34B fitted into grooves 36A and 36B. The bolts 42A and 42C are shown that secure the top and bottom fastening members.

An example of a method by which units 1A, 1B, 1C and 1D are assembled to form the base pedestal assembly is now described. To assemble the base pedestal assembly 9, two of the bottom fastening members 20B will be each temporarily attached to respective ends of unit 1A. Unit 1A with the bottom fastening members 20B attached will then be set in a desired location. Unit 1B will then be fitted onto the bottom fastening member 20B attached to the bottom of unit 1A. This procedure will be followed until the ends of all units 1A, 1B, 1C and 1D are joined with respective bottom fastening members 20B. At this point top fastening members 20A will be introduced and fastened to the projecting bolts previously used to temporarily attach fastening members 20B to the bottoms of base units 1A, 1B, 1C and 1D. Bolts are then tightened to securely fasten bottom and top fastening members 20A to 20B at each connection point of units 1A, 1B, 1C and 1D. To reduce or eliminate any subsequent movement, a material such as sand, grout and/or crushed rock is introduced into the open joints formed between units 1A, 1B, 1C and 1D. Introduction of this material will provide sufficient rigidity to secure vertical alignment and ensure that the connection thus obtained will develop the full bending capacity of the completed base pedestal assembly. That is, in this embodiment, the members are so joined as to render them effectively continuous across the joint as if the resulting base had been constructed in one piece. The material may be introduced to the joints at any suitable stage of the foregoing method.

Each base unit may be constructed of concrete, steel or aluminum. The base units may be precast or fabricated before transport to the site at which they are assembled.

While the connection of two block units for a crane pedestal base assembly are described above, it will be appreciated that the fastening device 8D can be used in other applications to connect two units together, such as two precast concrete units.

The embodiments described above should not be construed to limit the scope of the invention. The skilled artisan readily recognizes that many other embodiments are encompassed by the invention.

The invention claimed is:

1. A base assembly for supporting a crane pedestal comprising:
   (i) four base units, each having a first end and a second end, and each base unit being of an L-shape with an outside beveled corner;
   (ii) fastening devices for connecting each base unit at its first and second end to respective first and second ends of another of said four base units;
   the four base units being dimensioned so that, when connected by said fastening devices, the four base units form an octagonal-shaped base structure; and
   the four base units being dimensioned to support four pads that each rest on a face of each unit adjacent to its beveled corner when the four base units are assembled in the octagonal-shaped base structure.

2. The base assembly of claim 1, wherein the fastening devices clamp the four base units together in said octagonal-shaped base structure.

3. The base assembly of claim 1, wherein the fastening devices each comprise a top fastening member and a bottom fastening member connected by a securing assembly.

4. The base assembly of claim 3, wherein, when the base units are assembled as part of the base pedestal assembly, the top fastening member engages respective top faces of aligned ends of the base units and the bottom fastening member engages respective bottom faces of the aligned ends of the base unit.

5. The base assembly of claim 3, wherein the fastening devices allow for an amount of free movement between adjacent base units when partially assembled.

6. The base assembly of claim 1, wherein the fastening devices are clamps and allow for an amount of free movement between adjacent base units when connected to account for variations in soil modulus.

7. The base assembly of claim 1, wherein each base unit is of solid construction.

8. The base assembly of claim 1, wherein each base unit is constructed of concrete, steel or aluminum.

9. A method for assembling a base assembly for supporting a crane, said base pedestal assembly comprising four base units, each having a first end and a second end, and each base unit being of an L-shape with an outside beveled corner, said method comprising:
   (i) connecting the four base units with fastening devices for connecting the first and second ends of each base unit together, thereby forming an octagonal-shaped base structure; and
   (ii) placing four pads for supporting the crane on the octagonal-shaped base structure, each pad placed at a location adjacent to the beveled corner of each base unit in the octagonal-shaped base structure.

10. The method of claim 9, wherein the fastening devices each comprise a top fastening member and a bottom fastening member connected by a securing assembly, and wherein the connecting step comprises:
   (a) connecting the bottom fastening members to respective adjacent base units;
   (b) connecting the top fastening members to the respective adjacent base units;
   (c) securing the top and bottom fastening members by the securing assembly; and
   (d) introducing material in spaces between adjoining ends of the base units.

* * * * *